United States Patent
Kojima

(10) Patent No.: US 7,471,012 B2
(45) Date of Patent: Dec. 30, 2008

(54) POWER SUPPLY APPARATUS FOR VEHICLE

(75) Inventor: Yasushi Kojima, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 348 days.

(21) Appl. No.: 11/219,782

(22) Filed: Sep. 7, 2005

(65) Prior Publication Data

US 2006/0076833 A1    Apr. 13, 2006

(30) Foreign Application Priority Data

Oct. 8, 2004    (JP)    ............................... 2004-296441

(51) Int. Cl.
*B60L 1/00* (2006.01)
*B60L 3/00* (2006.01)
*H02G 3/00* (2006.01)

(52) U.S. Cl. ...................................................... 307/9.1
(58) Field of Classification Search ................... 307/9.1
See application file for complete search history.

(56) References Cited

U.S. PATENT DOCUMENTS

| | | | | |
|---|---|---|---|---|
| 3,871,472 | A * | 3/1975 | Hosaka et al. | 280/735 |
| 4,384,734 | A * | 5/1983 | Yasui | 280/735 |
| 4,938,504 | A * | 7/1990 | Fukuda et al. | 280/731 |
| 5,859,583 | A * | 1/1999 | Mayumi et al. | 340/436 |
| 2002/0180271 | A1 * | 12/2002 | Taniguchi et al. | 307/10.01 |

FOREIGN PATENT DOCUMENTS

| | | |
|---|---|---|
| DE | 4305819 | 9/1993 |
| DE | 10000551 | 7/2001 |
| DE | 10017455 | 10/2001 |
| DE | 10234389 | 2/2004 |
| EP | 1553422 | 7/2005 |
| GB | 2 265 240 A | 9/1993 |
| JP | 63300908 | 12/1988 |
| JP | 10-094101 | 4/1998 |
| JP | 11-185536 | 7/1999 |
| JP | 2001-039240 | 2/2001 |
| WO | WO 03/007450 A1 | 1/2003 |

OTHER PUBLICATIONS

European Search Report for corresponding application No. 05020106.0—2421, issued Jan. 19, 2006.

(Continued)

*Primary Examiner*—Stephen W Jackson
*Assistant Examiner*—Adi Amrany
(74) *Attorney, Agent, or Firm*—Kenyon & Kenyon LLP

(57) ABSTRACT

In a path along which lines extend between an engine room and a trunk room, the distance between the line 34 and the line 36 is made smaller than the distance between the line 32 and the line 34. Further, the distance between the line 36 and the line 38 is made smaller than the distance between the line 32 and the line 38. Even if a conductive member damages the lines upon collision of a vehicle, the lines 34 and 38 transmitting signals for control of the relays are more likely to be short-circuited with the line 36 to attain a ground potential than to be short-circuited with the line 32 to attain a power supply potential +B. This can lower the probability that the system main relays, once controlled to an open state upon collision, become conductive again after the collision.

11 Claims, 2 Drawing Sheets

OTHER PUBLICATIONS

Chinese Language Version of Chinese Office Action, Appln. No. 200510105086.5 dated Mar. 16, 2007.

English Language Translation of Chinese Office Action, Appln. No. 200510105086.5 dated Mar. 16, 2007.

* cited by examiner

POWER SUPPLY APPARATUS FOR VEHICLE

This nonprovisional application is based on Japanese Patent Application No. 2004-296441 filed with the Japan Patent Office on Oct. 8, 2004, the entire contents of which are hereby incorporated by reference.

BACKGROUND OF THE INVENTION

1. Field of the Invention

The present invention relates to a power supply apparatus for a vehicle, and more particularly to a power supply apparatus for a vehicle that employs both a high-voltage power source and a low-voltage power source.

2. Description of the Background Art

Japanese Patent Laying-Open No. 11-185536 discloses a technique related to a remote control cable configured with a power supply line and a signal line for operating a remote-controlled type vehicle for high lift work, wherein the power supply line is coated with a shield material connected to the earth.

According to this technique, when the cable is deteriorated with age or damaged by being trampled down, the power supply line comes into contact with the shield coating the line, which causes a short circuit to make a power supply current flow to the earth. If a current of more than a prescribed amount flows by the short circuit, a fuse will be blown to shut off the current. This can prevent erroneous flow of the current from the power supply line to the signal line that would cause an ON signal.

In recent years, an electric vehicle mounted with a high capacity battery providing a power supply voltage of some hundred volts and using the electric power stored in this battery to energize a motor for driving, and a hybrid vehicle using both of such a battery and a gasoline engine, have come into practical use.

A relay called a system main relay is arranged between the high capacity battery and a load circuit such as a motor. Upon collision of the vehicle, it is necessary to cause this system main relay to quickly attain an open state, so as to stop supply of power of a high voltage to the power supply line.

As such, when an ECU (Electronic Control Unit) detects a collision, it sets a control signal for controlling the system main relay to an inactive ground potential, to thereby stop the power supply.

Meanwhile, it is often the case that such a vehicle is mounted with a battery for auxiliary machinery of 12 V for driving the ECU, in addition to the high capacity battery.

In the case of a hybrid vehicle, an inverter is provided which generates an alternating current for driving the motor from a direct current supplied from the high capacity battery. This makes it difficult to secure the space in the engine room located in front of the passenger seat.

For such a reason, the high capacity battery and the battery for auxiliary machinery are sometimes positioned in the trunk room located at the rear of the passenger seat. This requires complicated wiring of the control signal line and the power supply line between the engine room and the trunk room.

Upon collision of the vehicle, the vehicle body is often damaged and deformed. In such a case, a conductive member may cut in the control signal line or the power supply line to cause a short circuit. If the member is the one electrically connected to the grounded vehicle body, even if it bites the control signal line, the control signal line would be fixed to the ground potential, preventing conduction of the system main relay.

In contrast, if a conductive member electrically isolated from the grounded vehicle body, such as a bracket, damages the signal line for controlling the system main relay and/or the power supply line from the battery for auxiliary machinery due to deformation of the vehicle body upon collision, it will cause a short circuit and the control signal line for controlling the system main relay may attain a power supply potential. In such a case, the system main relay, having once been set to the open state by control of the ECU, would become conductive again.

SUMMARY OF THE INVENTION

An object of the present invention is to provide a power supply apparatus for a vehicle that can reliably shut off a power supply current.

In summary, the present invention provides a power supply apparatus for a vehicle, which includes: a first power source; a load driven by the first power source; a connecting portion performing connection and disconnection of a current supply path between the first power source and the load; a control unit controlling the connection and disconnection by the connecting portion; a first line transmitting a control signal from the control unit to the connecting portion; and a second line coupled to a first constant potential corresponding to an inactive potential of the control signal and extending in parallel with the first line.

Preferably, the first power source and the connecting portion are arranged in a rear area with respect to a passenger seat in a vehicle, the load and the control unit are arranged in a front area with respect to the passenger seat in the vehicle, and the first and second lines extend in parallel between the rear area and the front area.

More preferably, the power supply apparatus for a vehicle further includes: a second power source arranged in the rear area and supplying a second constant potential corresponding to an active potential of the control signal to the control unit; and a third line connecting the second power source and the control unit and providing the second constant potential to the control unit. In a path along which the lines extend in parallel between the rear area and the front area, a distance between the first line and the second line is smaller than a distance between the first line and the third line.

Preferably, the rear area is a trunk room, and the front area is an engine room.

Preferably, the first and second lines form a twisted pair line.

Preferably, the power supply apparatus for a vehicle further includes a detecting portion detecting a collision. In this case, the control unit, in response to detection of a collision by the detecting portion, sets a level of the control signal to the inactive potential to cause the connecting portion to disconnect the current supply path.

A power supply apparatus for a vehicle according to another aspect of the present invention includes: a first power source; a load driven by the first power source; a connecting portion performing connection and disconnection of a current supply path between the first power source and the load; a control unit controlling the connection and disconnection by the connecting portion; a first line transmitting a control signal from the control unit to the connecting portion; a second line coupled to a first constant potential corresponding to an inactive potential of the control signal; a second power source supplying a second constant potential corresponding to an active potential of the control signal to the control unit; and a third line connecting the second power source and the control unit and providing the second constant potential to the control unit. In a portion where the first, second and third lines extend in parallel with each other, a distance between the second line and the third line is smaller than a distance between the first line and the third line.

Preferably, the first and second power sources and the connecting portion are arranged in a rear area with respect to a passenger seat in a vehicle, the load and the control unit are arranged in a front area with respect to the passenger seat in the vehicle, and the first, second and third lines extend in parallel between the rear area and the front area.

Preferably, the rear area is a trunk room, and the front area is an engine room.

Preferably, the second and third lines form a twisted pair line.

Preferably, the power supply apparatus for a vehicle further includes a detecting portion detecting a collision. The control unit, in response to detection of a collision by the detecting portion, sets a level of the control signal to the inactive potential to cause the connecting portion to disconnect the current supply path.

According to the present invention, the signal line controlling the system main relay is unlikely to be set to the active potential, so that the power supply current can be cut off still more reliably.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
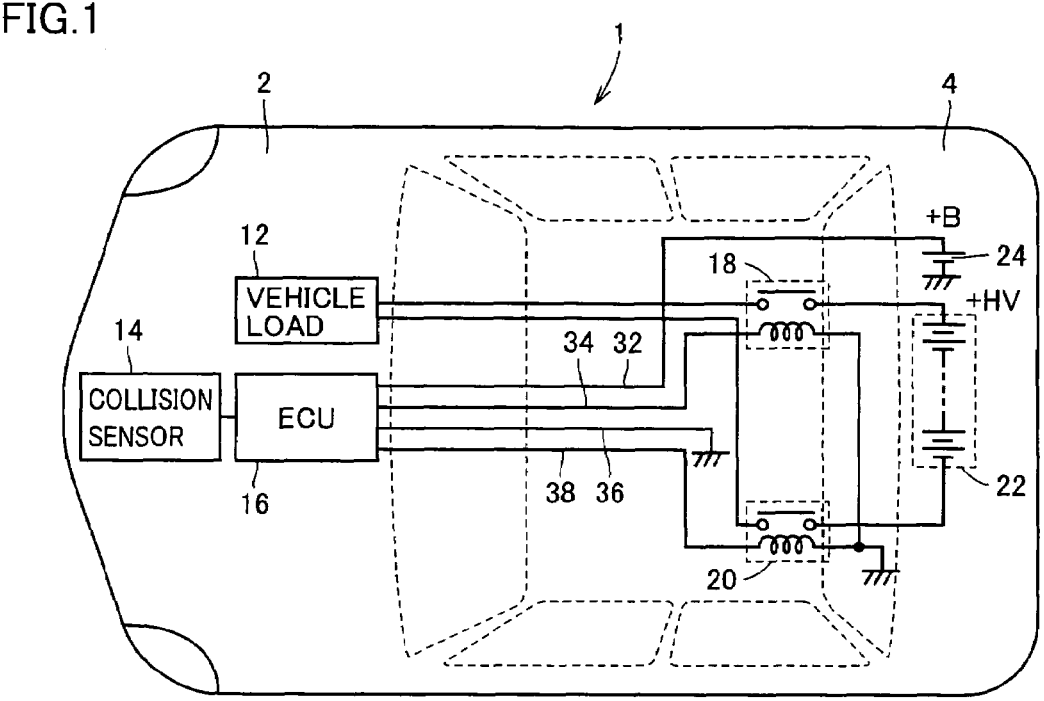
FIG. 1 is a circuit diagram showing a configuration of a power supply apparatus for a vehicle according to the present invention.

Hereinafter, embodiments of the present invention will be described in detail with reference to the drawings. In the drawings, the same or corresponding portions have the same reference characters allotted, and description thereof will not be repeated.

First Embodiment

FIG. 1 shows a configuration of a power supply apparatus for a vehicle according to the present invention.

Referring to FIG. 1, the power supply apparatus 1 for a vehicle includes a high-voltage battery 22 that outputs a high voltage +HV, a load for a vehicle (hereinafter, "vehicle load") 12 that is driven by high-voltage battery 22, and system main relays 18, 20 that perform connection and disconnection of a current supply path between high-voltage battery 22 and vehicle load 12. Power supply apparatus 1 for a vehicle is applicable to a hybrid vehicle, an electric vehicle or the like.

High-voltage battery 22 has a plurality of battery modules connected in series, and outputs high voltage +HV. For example, when 28 battery modules of 7.2 V each are connected in series, high voltage +HV of 201.6 V is output.

Vehicle load 12 is, e.g., a drive system that drives the wheels. The drive system includes a motor, and an inverter for driving the motor.

Power supply apparatus 1 for a vehicle further includes an ECU 16 that controls the connection and disconnection of system main relays 18, 20, lines 34, 38 that transmit control signals from ECU 16 to system main relays 18, 20, and a line 36 that is connected to a ground potential and extends in parallel with lines 34, 38.

High-voltage battery 22 and system main relays 18, 20 are arranged in a trunk room 4 that corresponds to a rear area with respect to the passenger seat in the vehicle. Vehicle load 12 and ECU 16 are arranged in an engine room 2 that corresponds to a front area with respect to the passenger seat in the vehicle. In the case of a hybrid vehicle, engine room 2 further contains an engine and an electric generator.

Lines 34, 38 and line 36 extend in parallel with each other between engine room 2 and trunk room 4.

Power supply apparatus 1 for a vehicle further includes a collision sensor 14 that detects a collision. ECU 16 sets the levels of lines 34, 38 to an active potential of +B, in accordance with the state of a power supply switch (not shown) manipulated by a driver, to render system main relays 18, 20 conductive. In response to collision sensor 14 detecting a collision, ECU 16 sets the levels of lines 34, 38 to an inactive potential of the ground potential, to cause system main relays 18, 20 to disconnect the current supply path.

Collision sensor 14 may be a contact point type collision sensor that performs on/off mechanically, or a semiconductor type collision sensor that has no contact point. In addition to or in place of the output of the collision sensor, an output of the ECU controlling air-bag ignition may be used.

Power supply apparatus 1 for a vehicle further includes a battery 24 for auxiliary machinery that is arranged in trunk room 4 and supplies to ECU 16 a power supply potential +B that corresponds to an active potential of the control signal, and a line 32 that connects battery 24 for auxiliary machinery and ECU 16 to provide power supply potential +B to ECU 16. Power supply voltage +B is normally 12 V, for example.

It is difficult to secure the space in engine room 2 in front of the passenger seat, since an inverter is mounted therein. Thus, high-voltage battery 22 and battery 24 for auxiliary machinery are arranged inside trunk room 4 at the rear of the passenger seat.

With such arrangement, lines 34, 36, 38 and line 32 extend in parallel between engine room 2 and trunk room 4. In this parallel path, the distance between lines 34 and 36 is made smaller than the distance between lines 32 and 34. The distance between lines 36 and 38 is made smaller than the distance between lines 32 and 38.

In doing so, even if a part of the vehicle is deformed by collision of the vehicle and a conductive member electrically isolated from the grounded vehicle body damages lines 32-38, the possibility that lines 34 and 38 transmitting the signals for controlling the relays are short-circuited with line 36 to attain a ground potential becomes higher than the possibility that they are short-circuited with line 32 to attain power supply potential +B.

Accordingly, it is possible to lower the probability that system main relays 18, 20, having once been controlled to an open state upon collision, become conductive again after the collision.

Figure 2:
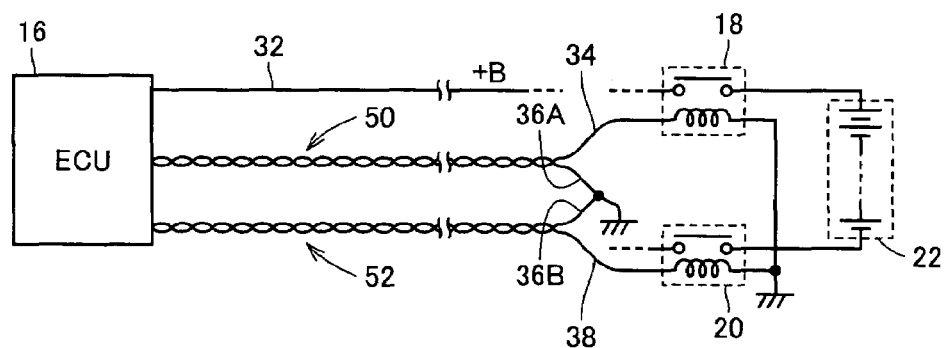
FIG. 2 illustrates a specific example of the lines in FIG. 1.

FIG. 2 illustrates a specific example of the lines in FIG. 1.

Referring to FIG. 2, high-voltage battery 22 outputting high voltage +HV has a positive electrode side connected to system main relay 18 and a negative electrode side connected to system main relay 20. System main relays 18, 20 each have a coil for control of conduction, having one end connected to the ground potential.

The conduction control coil of system main relay 18 has another end connected to line 34, and the conduction control coil of system main relay 20 has another end connected to line 38.

Line 34 forms a twisted pair line 50 with a line 36A that is coupled to the ground potential on the trunk room 4 side. Twisted pair line 50 is arranged to extend from trunk room 4 to ECU 16 within engine room 2. As such, line 34 transmitting a relay control signal is located closer to line 36A coupled to the ground potential than to line 32 providing power supply potential +B.

Line 38 forms a twisted pair line 52 with a line 36B that is coupled to the ground potential on the trunk room 4 side. Twisted pair line 52 is arranged to extend from trunk room 4 to ECU 16 within engine room 2. As such, line 38 transmitting a relay control signal comes closer to line 36B coupled to the ground potential than to line 32 providing power supply potential +B.

In this manner, the twisted pair line can be used to arrange the control line and the ground line close to each other in an inexpensive manner. The twisted pair line may be replaced with a shielded line having a shield coupled to the ground potential, to transmit a control signal.

Second Embodiment

Figure 3:
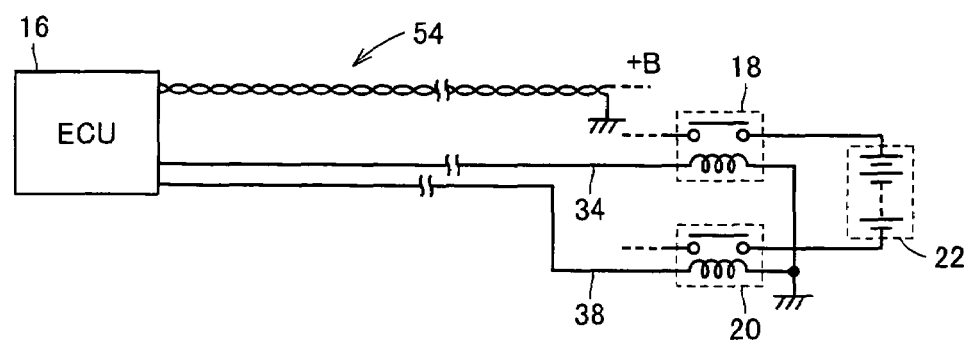
FIG. 3 illustrates a specific example of the lines according to a second embodiment of the present invention.

FIG. 3 illustrates a specific example of lines according to a second embodiment of the present invention.

Referring to FIG. 3, high-voltage battery 22 outputting high voltage +HV has a positive electrode side connected to system main relay 18 and a negative electrode side connected to system main relay 20. Of the conduction control coil provided at each of system main relays 18, 20, one end is connected to the ground potential.

The other end of the conduction control coil in system main relay 18 is connected to line 34, and the other end of the conduction control coil in system main relay 20 is connected to line 38.

The above-described configuration is similar to that of the first embodiment shown in FIG. 2. In FIG. 3, however, instead of lines 34 and 38, line 32 transmitting power supply potential +B makes a pair with a line coupled to the ground potential. That is, power supply potential +B and the ground potential are supplied to ECU 16 via the twisted pair line 54.

With such arrangement of the lines, the distance between the ground line and the power supply line decreases. The distance between the power supply line and line 34 and the distance between the power supply line and line 38 become greater than the distance between the ground line and the power supply line.

As such, even in the case where a part of the vehicle is deformed by collision and a conductive member electrically isolated from the grounded vehicle body damages the lines, the power supply line constituting the twisted pair line is short-circuited to the ground line to attain a ground potential, resulting in a smaller possibility that lines 34 and 38 transmitting signals for controlling the relays attain power supply potential +B.

Accordingly, it is possible to lower the probability that system main relays 18, 20, having once been controlled to an open state upon collision, become conductive again after the collision.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power supply apparatus for a vehicle, comprising:
a first power source;
a load driven by said first power source;
a connecting portion performing connection and disconnection of a current supply path between said first power source and said load;
a control unit controlling the connection and disconnection by said connecting portion;
a first line transmitting a control signal from said control unit to said connecting portion; and
a second line coupled to a first constant potential corresponding to an inactive potential of said control signal and extending in parallel with said first line, wherein said first power source and said connecting portion are arranged in a rear area with respect to a passenger seat in a vehicle, said load and said control unit are arranged in a front area with respect to said passenger seat in the vehicle, and said first and second lines extend in parallel between said rear area and said front area;
a second power source arranged in said rear area and supplying said control unit with a second constant potential corresponding to an active potential of said control signal; and
a third line connecting said second power source and said control unit and providing said second constant potential to said control unit, wherein in a path along which said lines extend in parallel between said rear area and said front area, a distance between said first line and said second line is smaller than a distance between said first line and said third line so that even if a part of the vehicle is deformed by collision, the probability of the connecting portion becoming conductive again is lowered.

2. The power supply apparatus for a vehicle according to claim 1, wherein
said rear area is a trunk room, and
said front area is an engine room.

3. The power supply apparatus for a vehicle according to claim 1, wherein said first and second lines form a twisted pair line.

4. The power supply apparatus for a vehicle according to claim 1, further comprising a detecting portion detecting a collision, wherein
said control unit, in response to detection of a collision by said detecting portion, sets a level of said control signal to said inactive potential to cause said connecting portion to disconnect said current supply path.

5. A power supply apparatus for a vehicle, comprising:
a first power source;
a load driven by said first power source;
a connecting portion performing connection and disconnection of a current supply path between said first power source and said load;
a control unit controlling the connection and disconnection by said connecting portion;
a first line transmitting a control signal from said control unit to said connecting portion;
a second line coupled to a first constant potential corresponding to an inactive potential of said control signal and extend in parallel with said first line, wherein said first power source and said connecting portion are arranged in a rear area with respect to a passenger seat in a vehicle, said load and said control unit are arranged in a front area with respect to said passenger seat in the vehicle, and said first and second lines extend in parallel between said rear area and said front area;

a second power source arranged in a rear area supplying said control unit with a second constant potential corresponding to an active potential of said control signal; and a third line connecting said second power source and said control unit and providing said second constant potential to said control unit; wherein in a portion where said first, second and third lines extend in parallel with each other, a distance between said second line and said third line is smaller than a distance between said first line and said third line so that even if a part of the vehicle is deformed by collision, the probability of the connecting portion becoming conductive again is lowered.

6. The power supply apparatus for a vehicle according to claim 5, wherein said first and second power sources and said connecting portion are arranged in said rear area with respect to a passenger seat in a vehicle, said load and said control unit are arranged in a front area with respect to said passenger seat in the vehicle, and said first, second and third lines extend in parallel between said rear area and said front area.

7. The power supply apparatus for a vehicle according to claim 6, wherein said rear area is a trunk room, and said front area is an engine room.

8. The power supply apparatus for a vehicle according to claim 5, wherein said second and third lines form a twisted pair line.

9. The power supply apparatus for a vehicle according to claim 5, further comprising a detecting portion detecting a collision, wherein said control unit, in response to detection of a collision by said detecting portion, sets a level of said control signal to said inactive potential to cause said connecting portion to disconnect said current supply path.

10. A power supply apparatus for a vehicle, comprising:
a first power source;
a load driven by said first power source;
a connecting portion performing connection and disconnection of a current supply path between said first power source and said load;
a control unit controlling the connection and disconnection by said connecting portion;
a first line transmitting a control signal from said control unit to said connecting portion; and
a second line coupled to a first constant potential corresponding to an inactive potential of said control signal and extending in parallel with said first line, wherein said first power source and said connecting portion are arranged in a rear area with respect to a passenger seat in a vehicle, said load and said control unit are arranged in a front area with respect to said passenger seat in the vehicle, and said first and second lines extend in parallel between said rear area and said front area so that even if a part of the vehicle is deformed by collision, the probability of the connecting portion becoming conductive again is lowered.

11. A power supply apparatus for a vehicle, comprising: a first power source;

a load driven by said first power source;

a connecting portion performing connection and disconnection of a current supply path between said first power source and said load;

a control unit controlling the connection and disconnection by said connecting portion;

a first line transmitting a control signal from said control unit to said connecting portion; wherein said first power source and said connecting portion are arranged in a rear area with respect to a passenger seat in a vehicle, said load and said control unit are arranged in a front area with respect to said passenger seat in the vehicle, and said first line extends from said rear area to said front area;

a second line coupled to a first constant potential corresponding to an inactive potential of said control signal, and said first and second lines extend in parallel between said rear area and said front area;

a second power source supplying a second constant potential corresponding to an active potential of said control signal; and a third line connecting said second power source and said control unit and providing said second constant potential to said control unit; wherein in a portion where said first, second and third lines extend in parallel with each other, a distance between said second line and said third line is smaller than a distance between said first line and said third line so that even if a part of the vehicle is deformed by collision, the probability of the connecting portion becoming conductive again is lowered.

* * * * *

UNITED STATES PATENT AND TRADEMARK OFFICE
CERTIFICATE OF CORRECTION

PATENT NO.       : 7,471,012 B2                          Page 1 of 1
APPLICATION NO.  : 11/219782
DATED            : December 30, 2008
INVENTOR(S)      : Yasushi Kojima It is certified that error appears in the above-identified patent and that said Letters Patent is hereby corrected as shown below:

| Column | Line | |
|---|---|---|
| 6 | 20 | After "area" and before the semicolon, insert the following: --so that even if a part of the vehicle is deformed by collision, the probability of the connecting portion becoming conductive again is lowered--. |
| 6 | 32 | After "said third line" insert --.-- and delete all text to end of claim 1. |
| 6 | 61 | Change "extend" to --extending--. |
| 6 | 67 | After "area" and before the semicolon, insert the following: --so that even if a part of the vehicle is deformed by collision, the probability of the connecting portion becoming conductive again is lowered--. |
| 7 | 10 | After "third line" insert --.-- and delete all text to end of claim 5. |
| 8 | 31 | After "front area" and before the semicolon, insert the following: --so that even if a part of the vehicle is deformed by collision, the probability of the connecting portion becoming conductive again is lowered--. |
| 8 | 41 | After "third line" insert --.-- and delete all text to end of claim 11. |

Signed and Sealed this

Tenth Day of November, 2009

David J. Kappos
*Director of the United States Patent and Trademark Office*